(12) United States Patent
Hashimoto

(10) Patent No.: US 7,280,178 B2
(45) Date of Patent: Oct. 9, 2007

(54) LIQUID CRYSTAL DISPLAY DEVICE AND METHOD OF MANUFACTURING THE SAME

(75) Inventor: Yoshiaki Hashimoto, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 389 days.

(21) Appl. No.: 11/007,157

(22) Filed: Dec. 9, 2004

(65) Prior Publication Data
US 2005/0128416 A1   Jun. 16, 2005

(30) Foreign Application Priority Data
Dec. 10, 2003   (JP) .............................. 2003/411873

(51) Int. Cl.
G02F 1/1345   (2006.01)
G02F 1/1339   (2006.01)

(52) U.S. Cl. ...................................... 349/152; 349/153

(58) Field of Classification Search ........ 349/149–152, 349/153, 54
See application file for complete search history.

(56) References Cited

U.S. PATENT DOCUMENTS 5,757,450 A * 5/1998 Fujii et al. .................. 349/106
5,850,275 A * 12/1998 Watanabe et al. ........... 349/152
6,680,759 B2 * 1/2004 Ogawa ......................... 349/54
6,975,377 B2 * 12/2005 Hsu et al. .................... 349/152
2003/0095225 A1   5/2003 Hsu et al.

FOREIGN PATENT DOCUMENTS

| JP | 2000-187236 A | 7/2000 |
| KR | 1999-022983 A | 3/1999 |
| TW | 525021 | 3/2003 |

* cited by examiner

Primary Examiner—Toan Ton
(74) Attorney, Agent, or Firm—Sughrue Mion, PLLC

(57) ABSTRACT

A liquid crystal display device includes a sealing member provided region of a line-extracting portion 508 which is divided into three or more regions (three regions of a region A 151, a region B 152, and a region C 153) to suppress the unevenness attributable to the difference in the density of the outgoing lines 108 reliably. Moreover, the variation in the, gap is suppressed to an indiscernible level in each of the regions. In addition, dummy patterns are formed on a different layer from the layer where the outgoing lines 108 are formed under a condition not affecting the curing of the sealing member. Moreover, dummy patterns are formed similarly on an edge opposed to the line-extracting portion 508 when appropriate.

9 Claims, 13 Drawing Sheets

411 REGION A

412 REGION B

413 REGION C

151 REGION A

152 REGION B

153 REGION C

FIG.17

| AVERAGE LEVEL DIFFERENCE | AVERAGE NUMBER OF INTERFERENCE FRINGES | JUDGMENT | NUMBER OF SAMPLES | REMARKS |
|---|---|---|---|---|
| 0.20 μm | 1 LINES | ○ | 700P AND ABOVE | STRUCTURE ACCORDING TO EMBODIMENT |
| 0.25 μm | 1 TO 2 LINES | ○ △ | 1000P AND ABOVE | |
| 0.40 μm | 2 TO 4 LINES | △ × | 500P AND ABOVE | CONVENTIONAL STRUCTURE |

LIQUID CRYSTAL DISPLAY DEVICE AND METHOD OF MANUFACTURING THE SAME

BACKGROUND OF THE INVENTION

1. Field of the Invention

The present invention relates to a liquid crystal display device and a method of manufacturing the same

2. Description of the Prior Art

As a display device of an audio-visual (AV) machine and an office automation (OA) machine, a liquid crystal display device (LCD) has been widely used because of its merits including thin thickness, a light weight, a low power consumption, and the like. This LCD includes a pair of substrates which face each other. Moreover, the LCD is configured to seal liquid crystal between the substrates. The LCD is designed to display an image by controlling a direction of alignment of liquid crystal molecules with an electric field using electrodes provided on the substrates, and thereby modulating light irradiated on the LCD. Concerning the LCD as described above, demands for higher definition and an increase in the screen size are growing in recent years, and it is important to enhance uniformity of a gap between the substrates facing each other in order to improve display quality.

Here, a typical method of manufacturing the conventional LCD will be outlined.

Firstly, in terms of a thin film transistor (TFT) substrate in the typical method of manufacturing the conventional LCD, gate lines and gate electrodes are formed with metal, such as aluminum (Al), on a transparent insulative substrate such as a glass substrate. On the gate lines and the gate electrodes, an a-Si layer and an n+a-Si layer are formed into island shapes in a TFT forming region through a gate insulating film made of a silicon nitride film or the like. Next, drain lines and source/drain electrodes are formed with metal such as chromium (Cr), and then channel etching is performed. Thereafter, a passivation film made of a silicon nitride film or the like is deposited, and then a transparent electrode such as indium tin oxide (hereinafter abbreviated as ITO) is deposited thereon to form pixel electrodes. Thereafter, an alignment layer film is coated and subjected to an alignment treatment in a predetermined direction to form the TFT substrate.

Meanwhile, in a counter substrate facing the TFT substrate, color filters in respective colors of RGB are formed on a transparent insulative substrate so as to correspond to the respective pixels. After forming a black matrix in positions corresponding to the TFTs and the lines of the TFT substrate, a transparent electrode made of ITO is formed. Then, an alignment layer is coated thereon and subjected to an alignment treatment in a predetermined direction to form the counter substrate.

Thereafter, as shown in FIG. 4A, a sealing member 105 made of photocuring resin or the like is coated on a line-extracting portion outside a display area of a TFT substrate 102 by use of a dispenser or the like. Then, as shown in FIG. 4B, an appropriate amount of a liquid crystal material 104 is dripped in a region surrounded by the sealing member 105 by use of a liquid crystal dripping dispenser 131 or the like. Then, spacers such as polymer beads or silica beads are sprinkled over a display area of a counter substrate 103. Thereafter, as shown in FIG. 4C, the TFT substrate 102 and the counter substrate 103 are aligned and adhered to each other at predetermined reduced-pressure atmosphere. Subsequently, the inside of a vacuum chamber is restituted to atmospheric pressure, whereby the TFT substrate 102 and the counter substrate 103 are pressed against each other from both outer sides utilizing a pressure difference from the atmospheric pressure. Simultaneously, light such as ultraviolet rays is irradiated onto a backside of the TFT substrate 102 to cure the sealing member 105. Then, the TFT substrate 102 and the counter substrate 103 are cut out at predetermined positions outside the sealing member 105 to finish a LCD 101.

Here, outgoing lines are formed at an outer peripheral portion of the TFT substrate 102 for connecting the gate lines as well as the drain lines to driver chips for driving the LCD 101 as well as to external circuits such as circuit boards. As the sealing member 105 is provided at this portion, a cross section of the region provided with the sealing member causes irregularities which correspond to the thickness of the outgoing lines. If the outgoing lines are arranged at a constant pitch along a certain direction, a change in the gap between the substrates caused by the irregularities attributable to the outgoing lines is not visually detectable. In the LCD, the TFT substrate 102 is connected to the external circuits by use of flexible substrates. Accordingly, the flexible substrates are disposed at given intervals. For this reason, the outgoing lines are also formed at the peripheral portion of the TFT substrate 102 in bent shapes. Therefore, the directions and intervals of the outgoing lines become uneven, and regions having narrow intervals between the outgoing lines and regions having wide intervals between the outgoing lines are generated at a certain interval. Resultantly, such a large cycle of irregularities due to the narrow and wide intervals is reflected in the gap between the substrates and is rendered visually detectable.

This problem will be described with reference to the drawings. FIG. 1A and FIG. 1B are views schematically showing a pattern of outgoing lines on a TFT substrate in a conventional LCD. As shown in the drawings, gate lines 112 and drain lines 116 are arranged at even intervals in a display area. However, outgoing lines 108 are bent at a peripheral portion of the TFT substrate 102 in conformity to pitches of flexible substrates 107 and are thereby formed into a pattern as shown in the enlarged view. As a result, the density of the outgoing lines 108 is high in a region 111 (a region A) where the outgoing lines 108 are arranged obliquely relative to an edge of the TFT substrate 102. Meanwhile, the density of the outgoing lines 108 is low in a region 112 (a region B) where the outgoing lines 108 are orthogonal to the edge of the TFT substrate 102. In addition, the outgoing lines 108 are not formed in a region 113 (a region C) between the adjacent flexible substrates 107. Accordingly, the gap varies in the respective regions depending on the difference in the density of the outgoing lines 108, and such variation of the gap causes deterioration in the display quality.

To suppress the variation of the gap attributable to the outgoing lines as described above, the LCD disclosed in Japanese Unexamined Patent Publication No. 2000-187236 includes a plurality of signal lines which are formed on one of a pair of substrates disposed so as to face each other while interposing a liquid crystal layer therebetween and are extracted to an end of the substrate, an interlayer insulating film formed on the signal lines, and a sealing member formed around the pair of substrates and configured to adhere the pair of substrates to each other while maintaining a given interval. Moreover, there is disclosed a liquid crystal display element in which a dummy member is formed between a signal line below a sealing portion and an adjacent signal line below the sealing portion in the same process, in the same width, and at the same pitch as the signal lines.

However, the structure disclosed in Japanese Unexamined Patent Publication No. 2000-187236 (p. 3 to 4, FIG. 1) has the following problems.

A first problem is that the outgoing lines 108 become denser along with the progress in terms of higher definition and narrower framework of the LCD. As a consequence, it is not possible to suppress unevenness in the gap attributable to the difference in the density of the outgoing lines sufficiently, and the display quality would be eventually deteriorated. Specifically, as described above, the region where the sealing member is provided is divided into the region A having high density of the outgoing lines 108, the region B having low density of the outgoing lines 108, and the region C where outgoing lines 108 are not formed. As an effective height (an average level difference) from a surface of the substrate varies among the respective regions, the difference in level between the region A and the region B is not solved even if the dummy pattern is provided in the region C, and the gap varies along with the difference in level. Moreover, the technique according to Japanese Unexamined Patent Publication No. 2000-187236 merely aims at equalizing the width and the pitch of the dummy pattern to those of the outgoing lines, or aligning the extending direction of the dummy pattern to the direction of the signal line. In other words, the technique according to Japanese Unexamined Patent Publication No. 2000-187236 does not define the width, the pitch, and the like of the dummy pattern so as to correlate with the display quality. Accordingly, this technique cannot maintain the display quality at a certain level. In addition, Japanese Unexamined Patent Publication No. 2000-187236 is only focused on the difference in level in terms of the edges where the gate lines and the drain lines are extracted. As the dummy pattern is not formed on an edge where the outgoing lines are not provided, this technique cannot suppress the variation in the gap between the substrates on the entire LCD.

Meanwhile, a second problem is that the outgoing lines formed on the same layer as the gate lines as well as the outgoing lines formed on the same layer as the drain lines tend to be short-circuited with the dummy pattern because the dummy pattern is formed at the same time in the step of forming the outgoing lines. As a result, defects attributable to short circuits among the lines may occur more frequently.

Meanwhile, a third problem is that there may be a case where it is not possible to cure the sealing member 105 completely. While the sealing member 105 is supposed to be cured by irradiating light such as ultraviolet rays onto the backside of the TFT substrate 102, the technique according to Japanese Unexamined Patent Publication No. 2000-187236 does not set the width, the pitch, and the like of the dummy pattern in consideration of a condition for curing the sealing member 105.

The present invention has been made in consideration of the foregoing problems. A main object of the present invention is to provide a LCD and a manufacturing method thereof, which are capable of improving display quality by achieving a uniform gap in a region provided with a sealing member located in the periphery of a substrate, and capable of preventing defects such as short circuits among outgoing lines or insufficient curing of a sealing member.

SUMMARY OF THE INVENTION

A liquid crystal display device according to the present invention includes a TFT substrate. The TFT substrate includes first lines on a lower layer and second lines on an upper layer, which are provided on a transparent insulative substrate approximately perpendicularly to each other, and thin film transistors provided in respective regions surrounded by the first lines and the second lines. The liquid crystal display device also includes a counter substrate facing the TFT substrate. Here, the TFT substrate and the counter substrate are adhered to each other by use of a sealing member provided in the periphery of at least one of the substrates, and liquid crystal is interposed between the TFT substrate and the counter substrate.

Moreover, outgoing lines for connecting the first lines or the second lines to an external circuit are formed in the periphery of two edges of the TFT substrate in the liquid crystal display device of the present invention. In addition, a region where the sealing member is provided within a region where the outgoing lines are formed is divided into three or more regions depending on the density of the outgoing lines. In at least two regions out of the three or more regions, dummy patterns formed by the first lines or the second lines are provided on a different layer from a layer where the outgoing lines are formed on so as not to overlap the outgoing lines.

Meanwhile, in the liquid crystal display, device of the present invention, the outgoing lines for connecting the first lines or the second lines to the external circuit are formed in the periphery of the two edges of the TFT substrate. In addition, the region where the sealing member is provided within the region where the outgoing lines are formed is divided into a first region where the outgoing lines are formed obliquely relative to the edge of the TFT substrate, a second region where the outgoing lines are formed in an orthogonal direction to the edge, and a third region without formation of the outgoing lines. Here, dummy patterns formed by the first lines or the second lines are provided at least in the second region and the third region on a different layer from a layer where the outgoing lines are formed so as not to overlap the outgoing lines. Further, either a dummy pattern including a plurality of approximately parallel lines or a dot-shaped dummy pattern is provided between the adjacent outgoing lines in the second region.

In the present invention, it is preferable to provide the dummy pattern so as to set a difference between a maximum value and a minimum value of average level differences, which are calculated by dividing cross-sectional areas of the respective constituents by widths of the regions in terms of each of the three or more regions or the first to third regions, is set equal to or below 0.3 µm.

Moreover, in the present invention, the liquid crystal display device may further include a dummy pattern formed by the first lines or the second lines in a region on an edge opposed to the edge having the outgoing lines, the region where the sealing member is provided. Moreover, when common lines are formed on the same layer as the first lines, dummy patterns which also function as the common lines are provided in the region of the opposed edge where the sealing member is provided.

Meanwhile, in the present invention, when the sealing member is made of a material to be cured by light irradiated onto a backside of the TFT substrate, a proportion of an area of a region without provision of the outgoing lines or the dummy pattern within the region where the sealing member is provided is set equal to or above 25% from a viewpoint along a normal line of the substrate. Moreover, it is also possible to set a width of the dummy pattern approximately equal to or below 80 µm.

Furthermore, in the present invention, the second lines may adopt a laminated structure formed by laminating a semiconductor layer constituting the thin film transistors and a metallic layer constituting the drain lines.

BRIEF DESCRIPTION OF THE DRAWINGS

FIG. 17 is a table showing results of display quality evaluated by measuring the number of interference fringes appearing on display surfaces of LCDs in three types of a structure according to the embodiment having the average level difference of 0.20 μm (700 samples or above), a conventional structure having the average level difference of 0.40 μm (100000 samples or above), and a structure having the average level difference of 0.25 μm (500 samples or above).

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

In one preferable embodiment, a LCD of the present invention includes a TFT substrate. The TFT substrate includes first lines on a lower layer and second lines on an upper layer, which are provided on a transparent insulative substrate approximately perpendicularly to each other, and thin film transistors (TFTs) provided in respective regions surrounded by the first lines and the second lines. The LCD also includes a counter substrate facing the TFT substrate. Here, the TFT substrate and the counter substrate are adhered to each other by use of a sealing member provided in the periphery of at least one of the substrates, and liquid crystal is interposed between the TFT substrate and the counter substrate.

Moreover, in the LCD of the present invention, a sealing member provided region of a line-extracting portion in the periphery of the TFT substrate is divided into three regions of a region having high density of outgoing lines, a region having low density of outgoing lines, and a region without provision of outgoing lines. In addition, the LCD of the present invention includes dummy patterns of predetermined shapes in at least two or more regions on one edge out of the three regions and on a different layer from a layer where the outgoing lines are formed, in consideration of an effective height (an average level difference) from a surface of the substrate calculated by dividing a cross-sectional area of the respective constituents by width dimensions and of a condition for curing the sealing member.

Therefore, the LCD of the present invention can improve display quality by achieving a uniform gap between the substrates in the periphery of the LCD and prevent defects such as short circuits among the outgoing lines or insufficient curing of the sealing member.

First Embodiment

To describe more detail on the above-described embodiment of the present invention, an LCD according to an embodiment of the present invention and a manufacturing method thereof will be described with reference to FIG. 5A to FIG. 17.

Figure 5A:
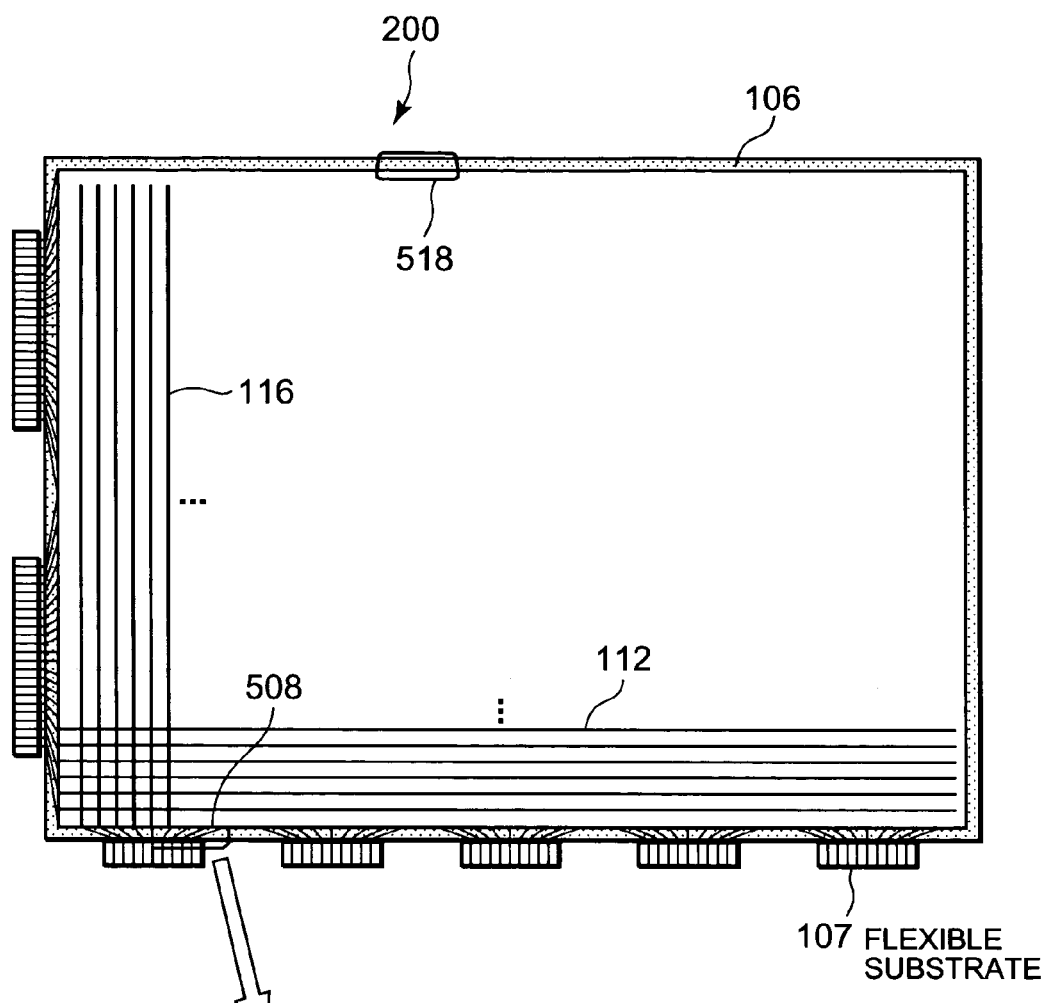
FIG. 5A is a plan view showing a pattern of lines on a TFT substrate according to a first embodiment of the present invention.
Figure 6:
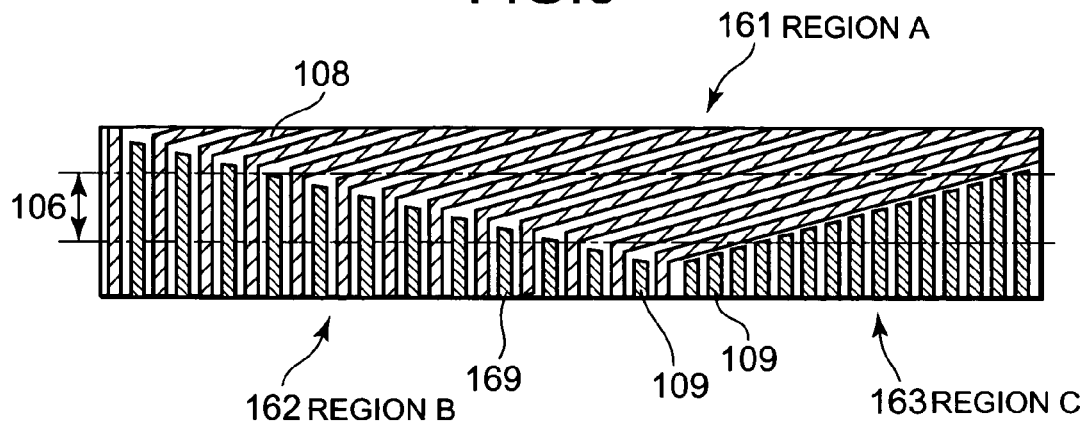
FIG. 6 is a plan view showing a variation of a structure of the line-extracting portion according to the first embodiment of the present invention.
Figure 7:
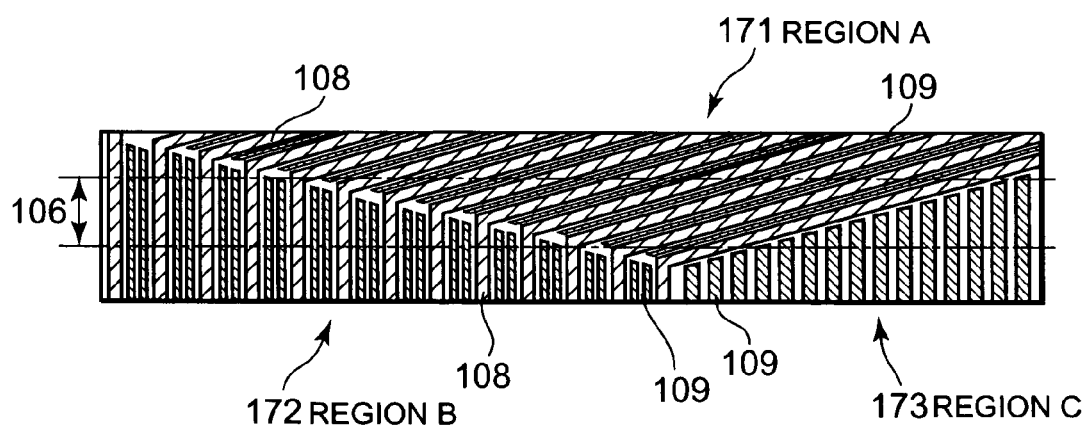
FIG. 7 is a plan view showing another variation of the structure of the line-extracting portion according to the first embodiment of the present invention.
Figure 8:
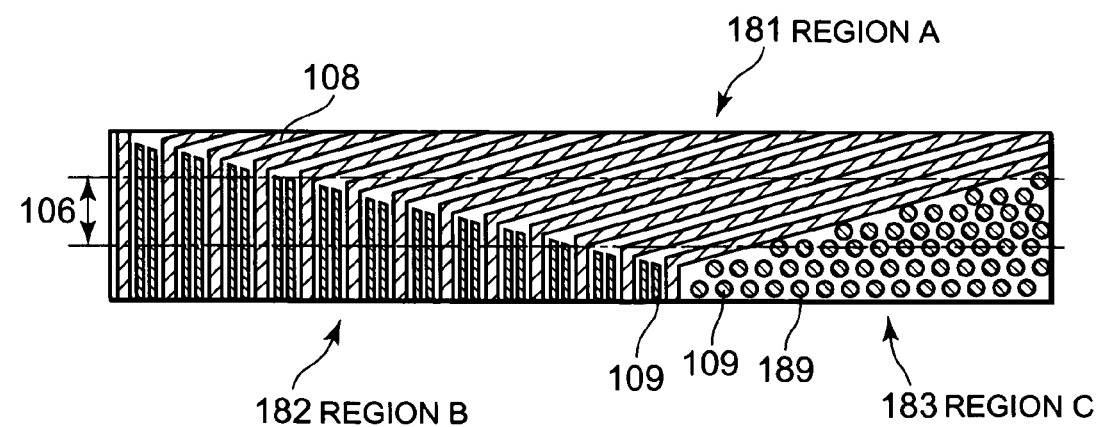
FIG. 8 is a plan view showing still another variation of the structure of the line-extracting portion according to the first embodiment of the present invention.
Figure 9:
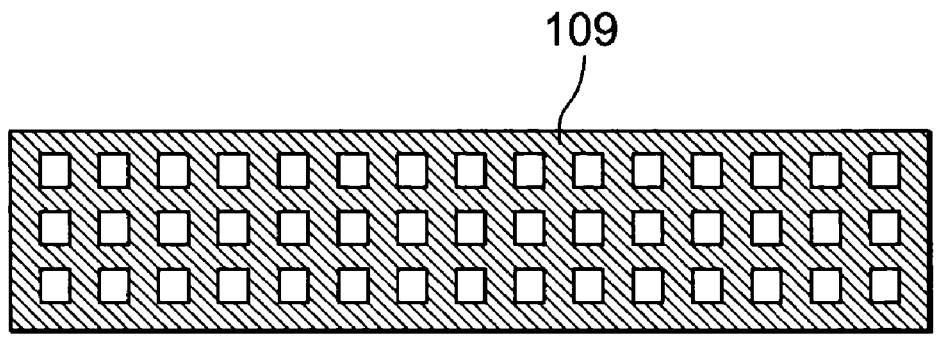
FIG. 9 is a plan view showing a variation of a structure of a common junction according to the first embodiment of the present invention.
Figure 10:
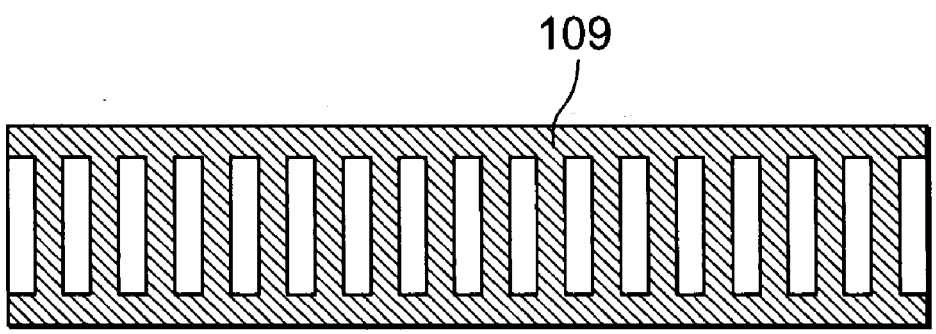
FIG. 10 is a plan view showing another variation of the structure of the common junction according to the first embodiment of the present invention.
Figure 11:
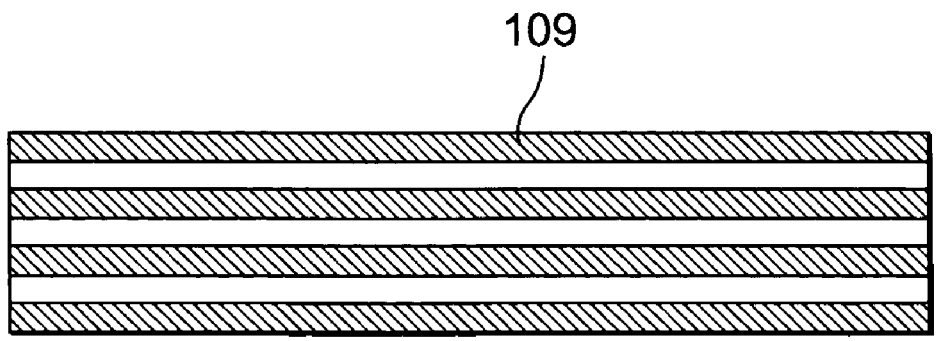
FIG. 11 is a plan view showing still another variation of the structure of the common junction according to the first embodiment of the present invention.
Figure 12A:
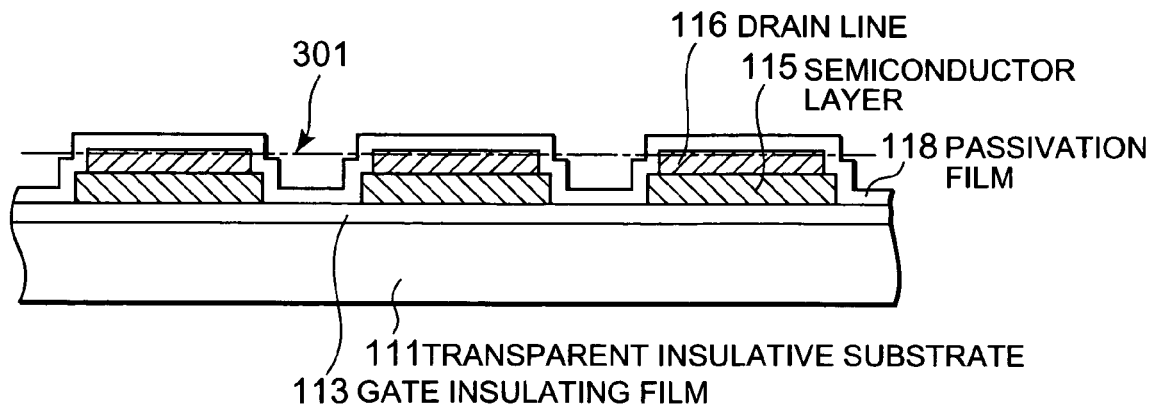
FIG. 12A is a cross-sectional view showing the structure of the line-extracting portion according to the first embodiment of the present invention, which is a schematic cross-sectional view taken along the I-I line in a region A (151).
Figure 12B:
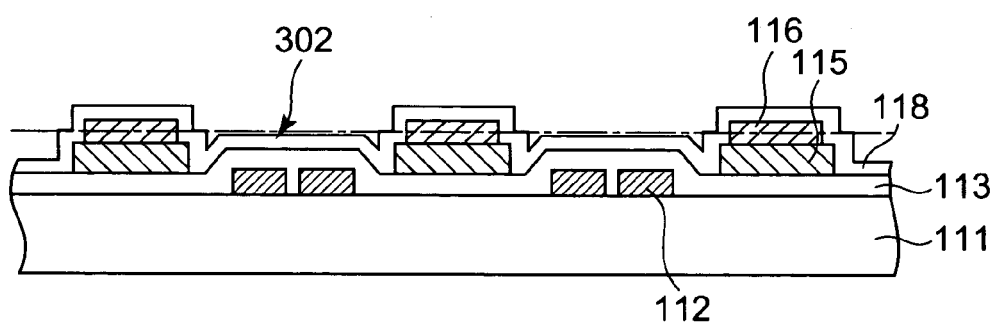
FIG. 12B is a cross-sectional view showing the structure of the line-extracting portion according to the first embodiment of the present invention, which is a schematic cross-sectional view taken along the II-II line in a region B (152).
Figure 12C:
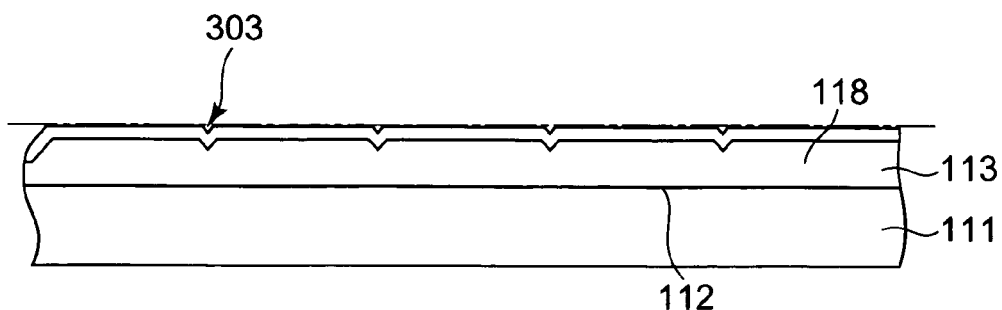
FIG. 12C is a cross-sectional view showing the structure of the line-extracting portion according to the first embodiment of the present invention, which is a schematic cross-sectional view taken along the III-III line in a region C (153).
Figure 13:
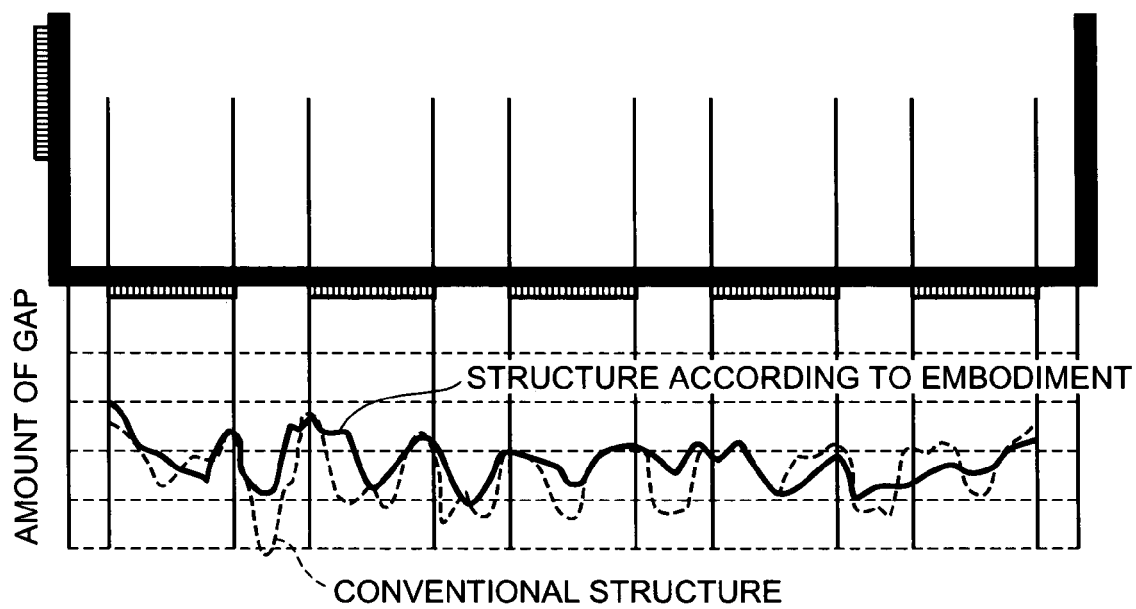
FIG. 13 is a view showing measurement results in terms of unevenness of a gap in a LCD according to the first embodiment of the present invention.
Figure 14:
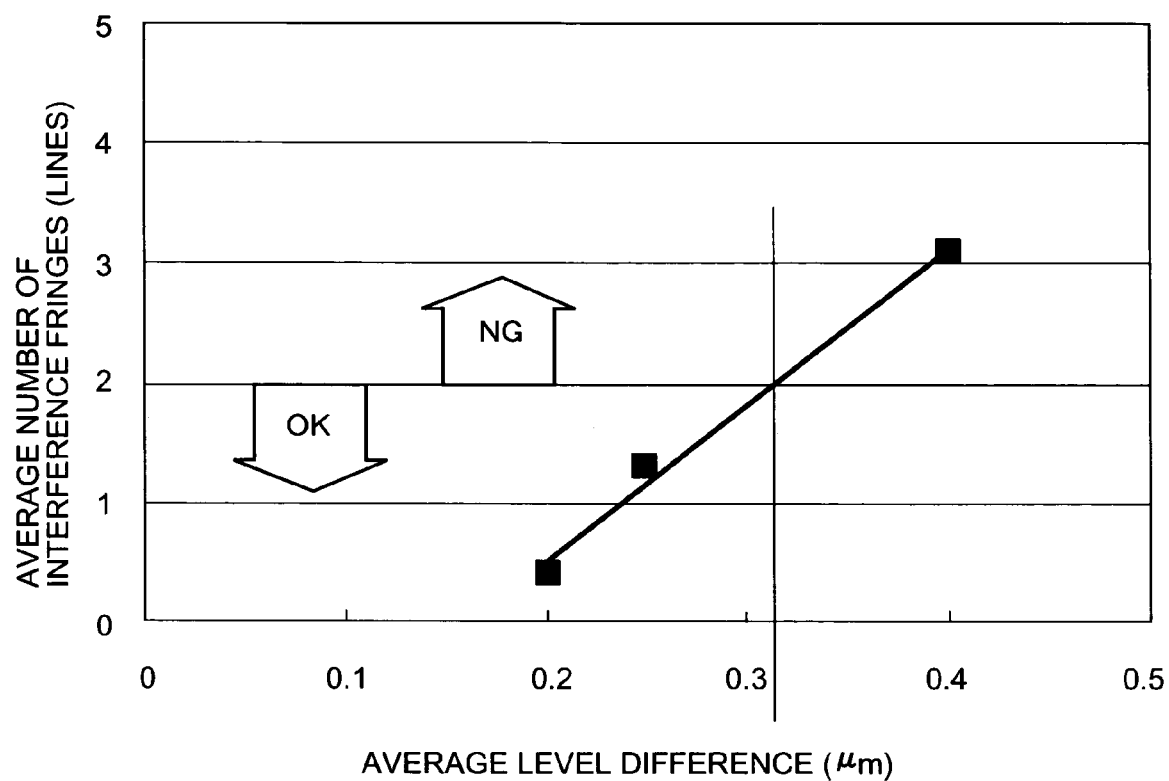
FIG. 14 is a view showing a correlation between an average level difference and the number of interference fringes in the LCD according to the present invention.
Figure 15A:
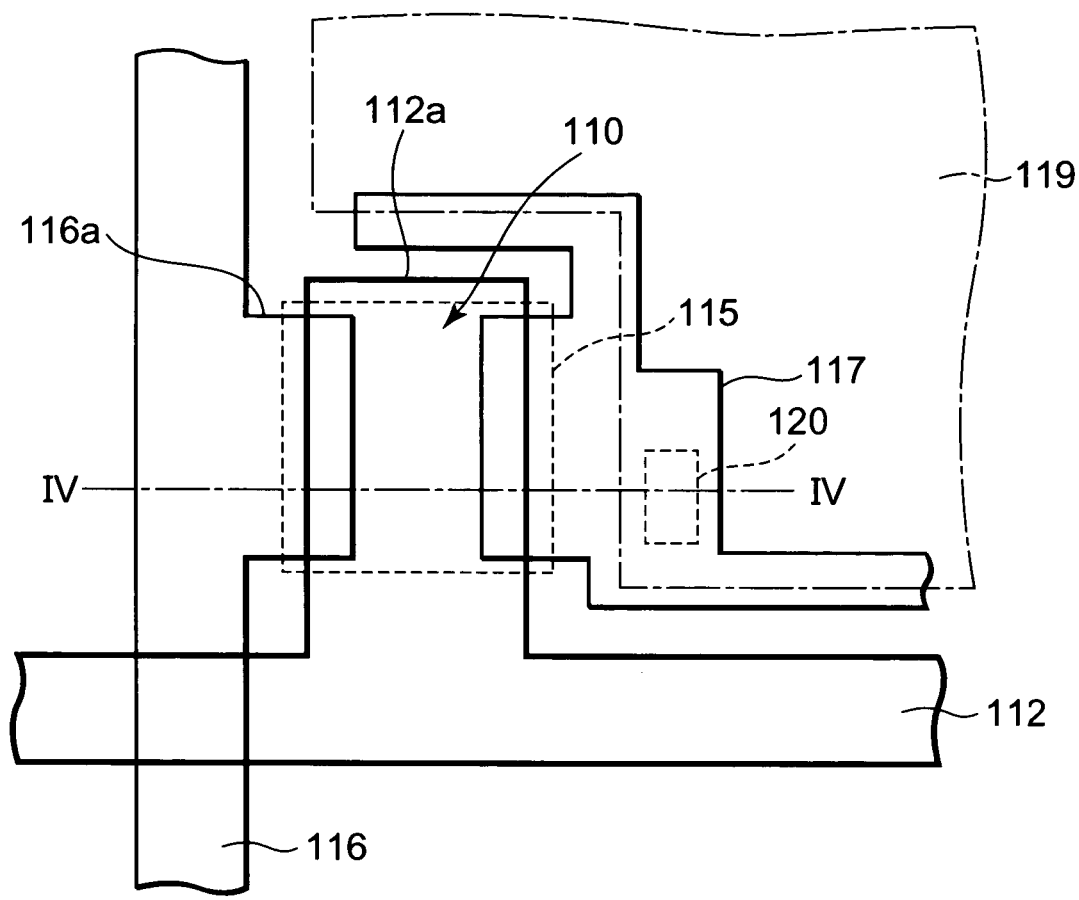
FIG. 15A is a plan view showing a structure of a TFT substrate formed in accordance with a 5-mask process.
Figure 15B:
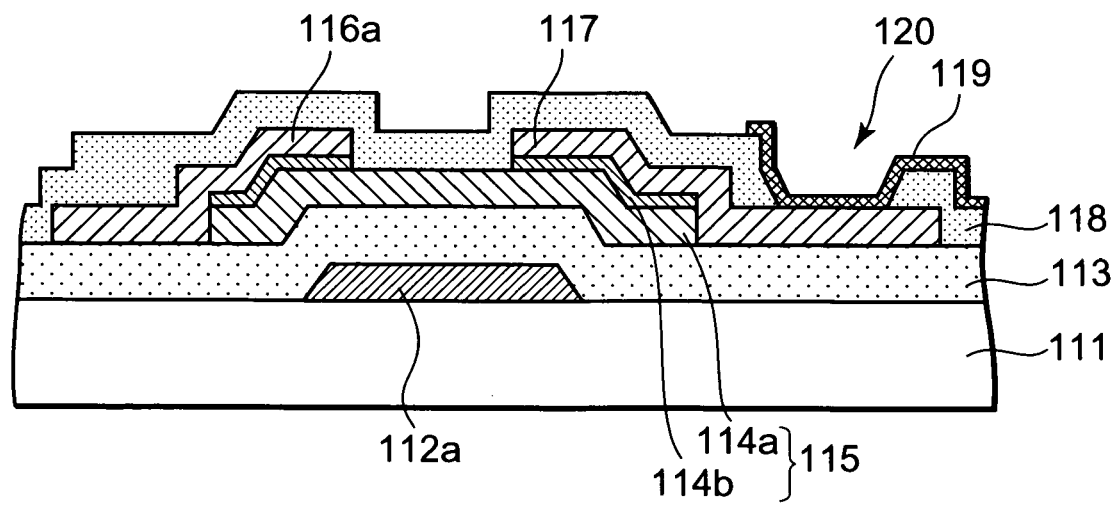
FIG. 15B is a schematic cross-sectional view taken along the IV-IV line in the plan view showing the structure of the TFT substrate in FIG. 15A
Figure 16A:
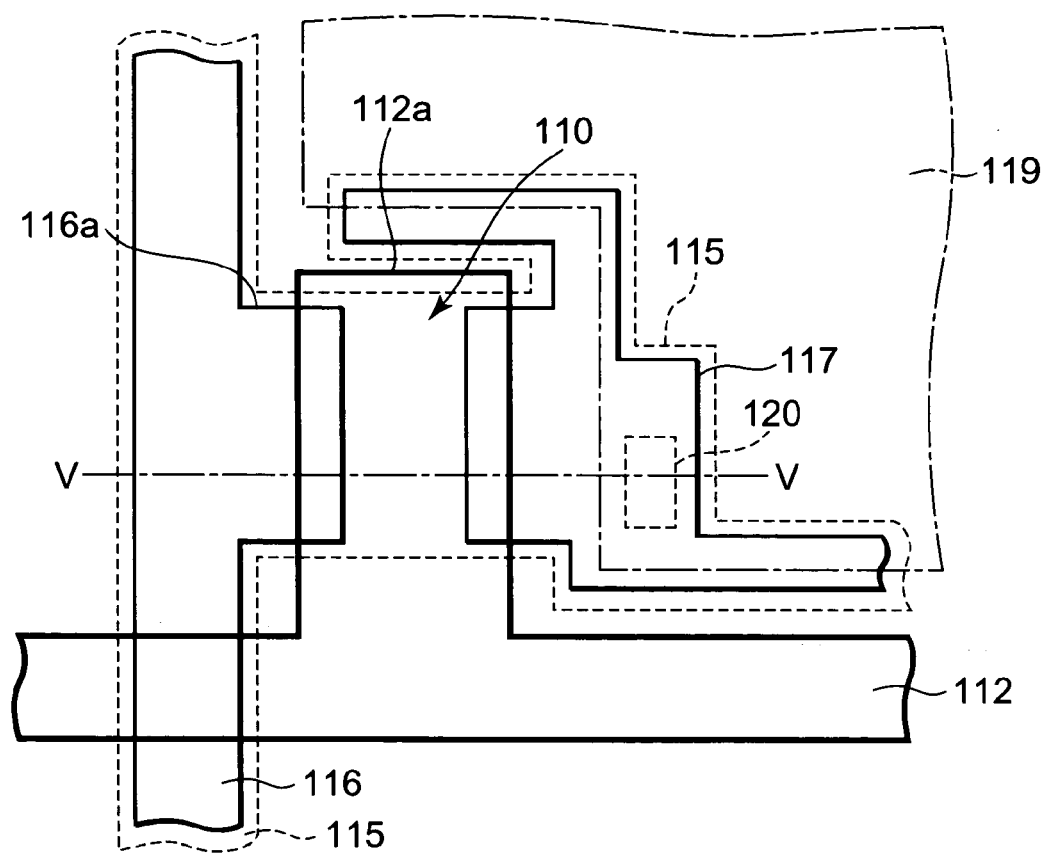
FIG. 16A is a plan view showing a structure of a TFT substrate formed in accordance with a 4-mask process.
Figure 16B:
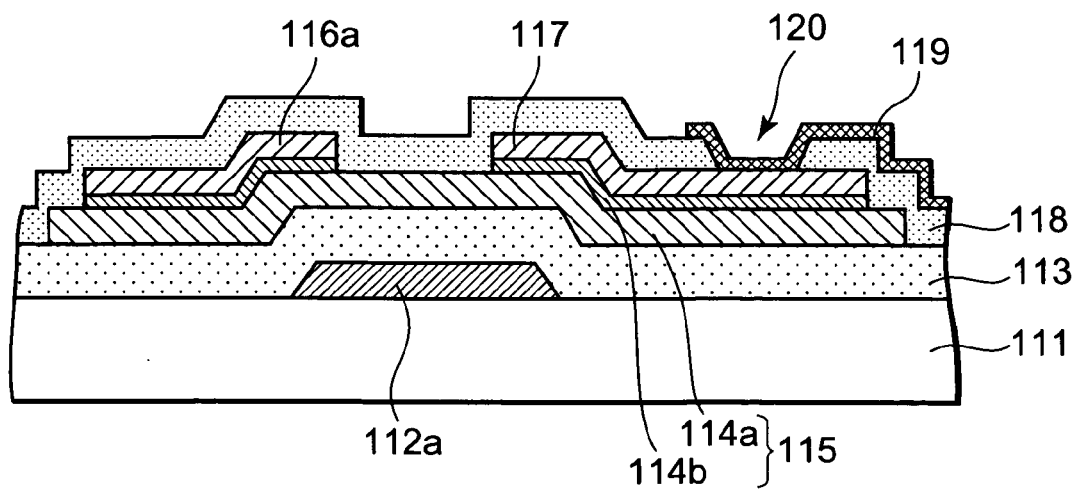
FIG. 16B is a schematic cross-sectional view taken along the V-V line in the plan view showing the structure of the TFT substrate in FIG. 16A.

FIG. 5A is a plan view schematically showing a pattern of the outgoing lines on the TFT substrate according to an embodiment of the present invention. FIG. 6 to FIG. 8 are plan views showing variations of the line-extracting portion. FIG. 9 to FIG. 11 are plan views showing variations of a common junction. Meanwhile, FIG. 12A to FIG. 12C are cross-sectional views showing level differences in the respective regions of the line-extracting portion. FIG. 13 and FIG. 14 are views for explaining effects of the LCD of this embodiment. Moreover, FIG. 15A and FIG. 15B are views for explaining conventional five steps (a gate pattern forming step, a semiconductor layer pattern forming step, a drain pattern forming step, a contact pattern forming step, and a pixel pattern forming step, hereinafter collectively referred to as a 5-mask process). In addition, FIG. 16A and FIG. 16B are views for explaining conventional four steps (a gate pattern forming step, a semiconductor layer pattern forming step (which combines a drain pattern forming step), a contact pattern forming step, and a pixel pattern forming step, hereinafter collectively referred to as a 4-mask process).

As described previously, the sealing member provided region of the line-extracting portion in the conventional LCD is divided into a region A having high density of outgoing lines 108, a region B having low density of the outgoing lines 108, and a region C where the outgoing lines 108 are not formed. The conventional LCD had a problem that differences in levels were caused among the regions due to the density of the outgoing lines 108, and that the gap between the substrates periodically varied in the direction of the edge of the TFT substrate. This problem becomes more significant along with the progress in terms of higher definition and narrower framework.

Meanwhile, a conventional TFT substrate 102 has been manufactured in five steps (a gate pattern forming step, a semiconductor layer pattern forming step, a drain pattern forming step, a contact pattern forming step, and a pixel pattern forming step, hereinafter collectively referred to as a 5-mask process). Accordingly, as shown in FIG. 15A and FIG, 15B, only a gate insulating film 113 has been formed below a drain line 116.

However, a TFT substrate 2 of a LCD can be manufactured in fewer steps in recent years. Specifically, the LCD is manufactured in four steps (a gate pattern forming step, a semiconductor layer pattern forming step (which combines a drain pattern forming step), a contact pattern forming step, and a pixel pattern forming step, hereinafter collectively referred to as a 4-mask process).

In the 4-mask process, the semiconductor layer pattern forming step and the drain pattern forming step are performed by use of one mask. Accordingly, as shown in FIG. 16A and FIG. 16B, a semiconductor layer 115 is formed below the drain line 116 as well. As a result, the level difference caused by the outgoing lines 108 is increased even more, and the variation in the gap between the substrates attributable to the unevenness of the outgoing lines 108 is increased.

Figure 2A:
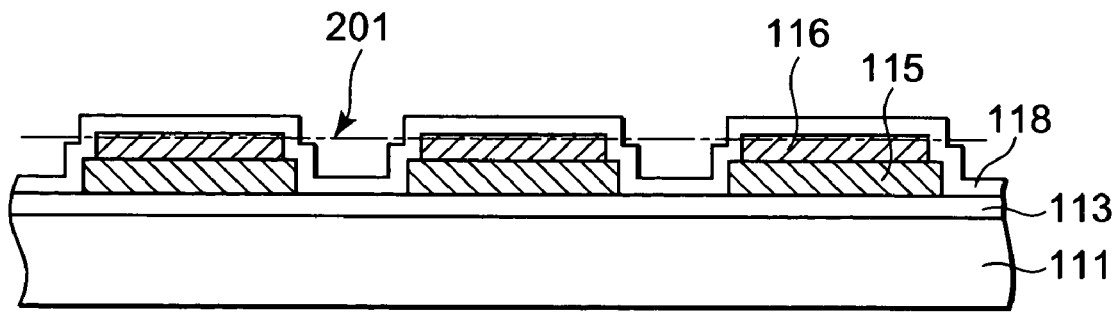
FIG. 2A is a schematic cross-sectional view of the line-extracting portion 208 of the TFT substrate, which is taken along the VI-VI line in FIG. 1B.
Figure 2B:
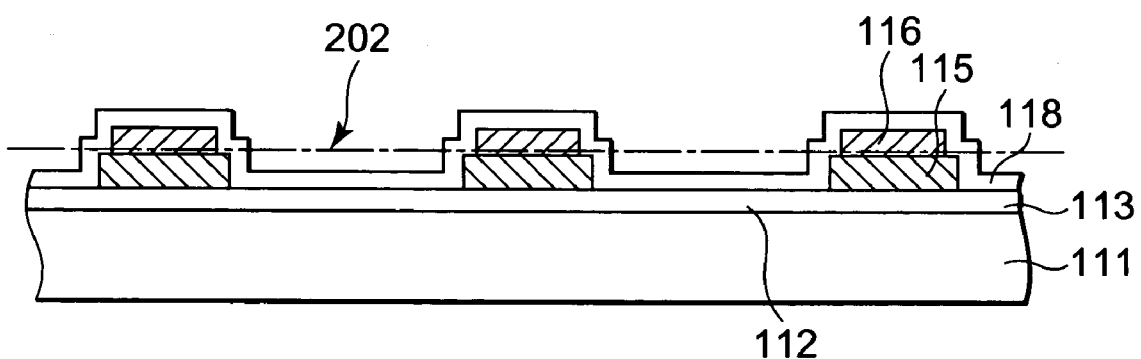
FIG. 2B is a schematic cross-sectional view of the line-extracting portion 208 of the TFT substrate, which is taken along the VII-VII line in FIG. 1B.
Figure 2C:
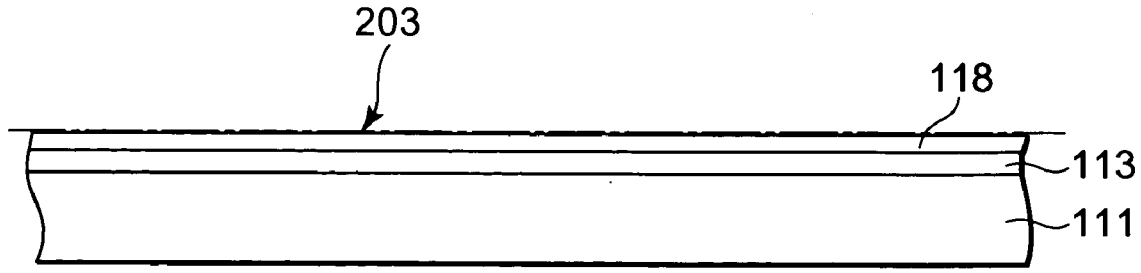
FIG. 2C is a schematic cross-sectional view of the line-extracting portion 208 of the TFT substrate, which is taken along the VIII-VIII line in FIG. 1B.

This problem will be described with reference to the accompanying drawings. FIG. 2A to FIG. 2C are cross-sectional views schematically showing the level differences among the regions A, B, and C of the conventional TFT substrate 2 formed by the 4-mask process. As shown in FIG. 2A, since a width of the outgoing line 108 on which the semiconductor layer 115 and the drain line 116 are laminated has a large width in the region A 411, a value (an average level difference) calculated by dividing a total area of a cross section of the respective constituents (the gate insulating film 113, the semiconductor layer 115, the drain line 116, and a passivation film 118) in a unit portion by a width of the unit portion becomes a position indicated by a dashed line in the drawing. Meanwhile, in the region B 412, the average level difference becomes lower than that in the region A411 because the width of the outgoing line 108 is narrower. Moreover, in the region C 413, the average level difference coincides with an upper surface of the passivation film 118 because the outgoing lines 108 are not formed therein and therefore becomes even lower than that in the region B 412. As a result, the regions having different average level differences are repeated for each flexible substrate 107 in a direction parallel to the edge of the TFT substrate 2, and the gap between the substrates varies in response to the average level differences.

Figure 3A:
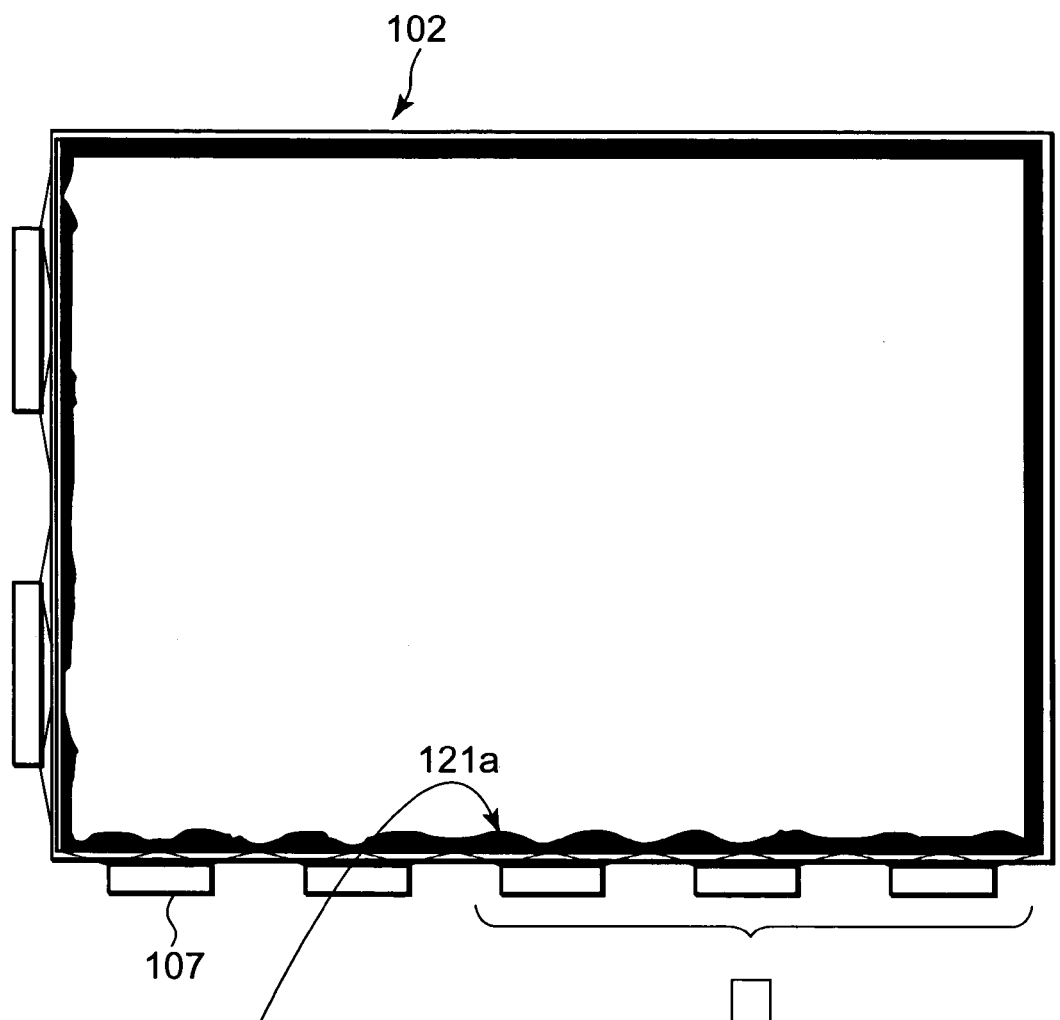
FIG. 3A is a view showing emergence of unevenness 121a of a gap (a region having a wide gap corresponds to a bottom of a wave in the drawing, and a region having a wide gap corresponds to a peak of the wave) for each of flexible substrates 7 shown in FIG. 1A.
Figure 3B:
FIG. 3B is a view obtained by capturing a portion corresponding to three flexible substrates 7 on the lower right in FIG. 3A and performing image processing of the captured image, in which portions corresponding to the peaks of the wave are visually detected as uneven displays.

This aspect is schematically shown in FIG. 3A, in which unevenness 121a of the gap (a region having a wide gap corresponds to a bottom of a wave in the drawing, and a region having a wide gap corresponds to a peak of the wave) emerges for each flexible substrate 7. Meanwhile, FIG. 3B is a view obtained by capturing a portion 121b corresponding to three flexible substrates 7 on the lower right in FIG. 3A and performing image processing of the captured image, in which portions corresponding to the peaks of the wave are visually detected as uneven displays.

Figure 1A:
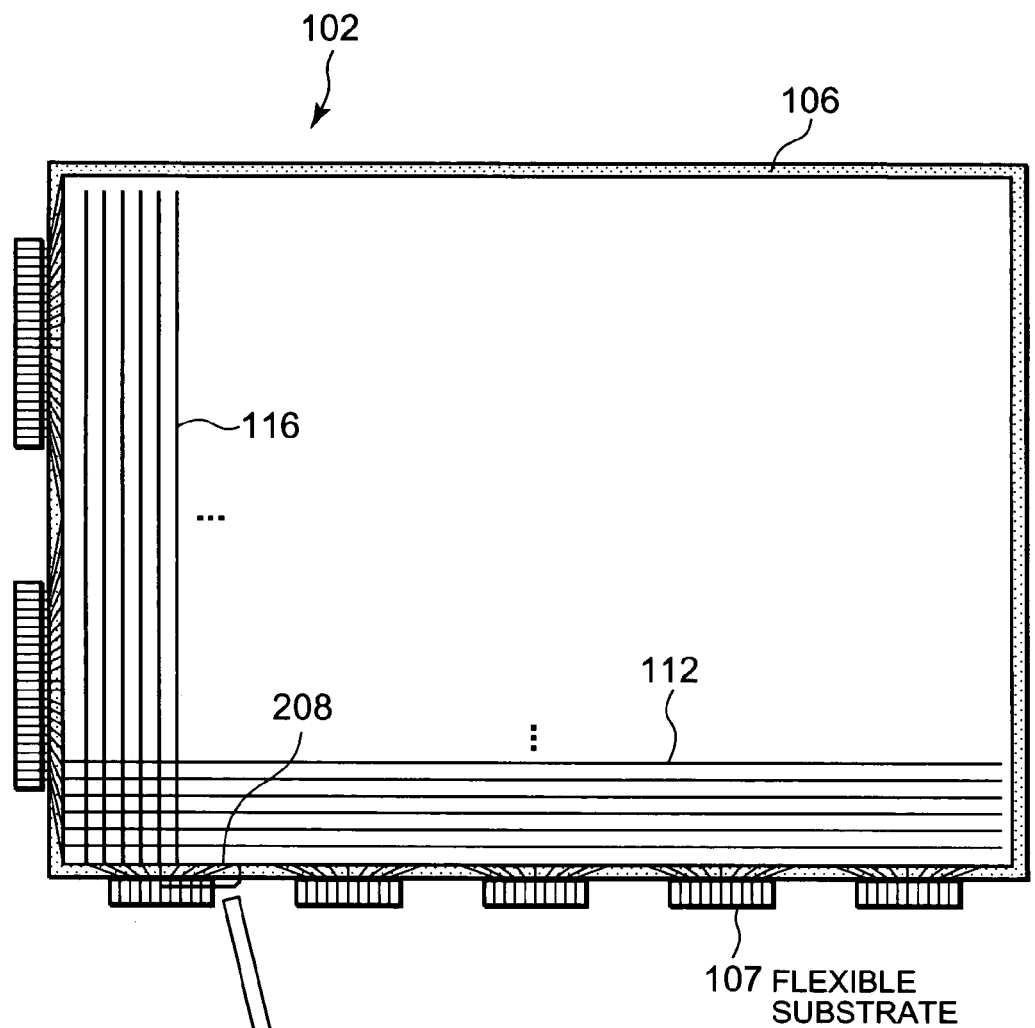
FIG. 1A is a plan view showing a pattern of lines on a TFT substrate in a conventional LCD.
Figure 1B:
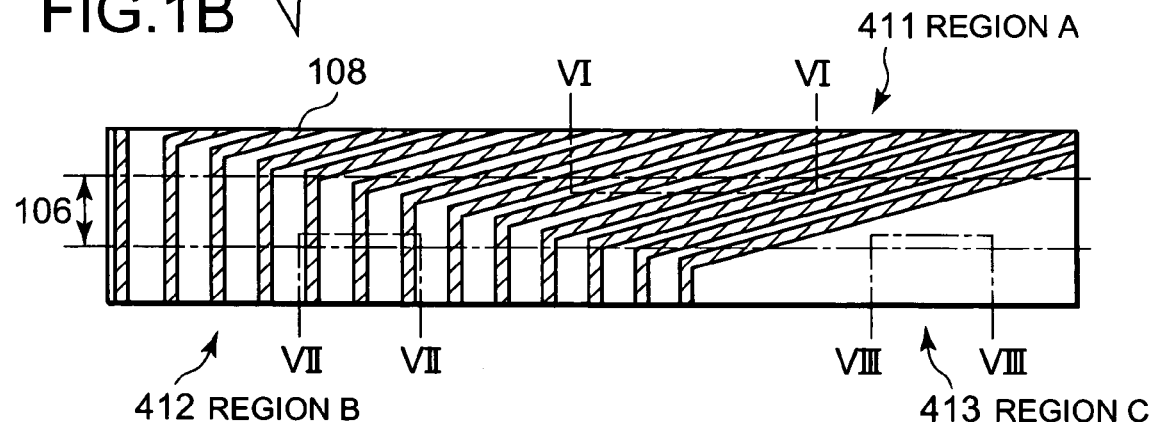
FIG. 1B is an enlarged plan view of a line-extracting portion 208 of the TFT substrate shown in FIG. 1A.

In response to this problem, according to Japanese Unexamined Patent Publication No. 2000-187236 (p. 3 to 4, FIG. 1), a dummy pattern is provided only in the region C 413. However, as it is apparent in FIG. 3A, there is also a difference in the gap between the region A 411 and the region B 412. Accordingly, it is not possible to suppress the variation in the gap to an indiscernible degree by proving the dummy pattern only in the region C 413.

Therefore, in this embodiment, to suppress the unevenness attributable to the difference in the density of the outgoing lines 108 reliably, a sealing member provided region of a line-extracting portion 508 is divided into three or more regions (which will be hereinafter defined as three regions of a region A 151, a region B 152, and a region C 153). Moreover, in this embodiment, the variation in the gap is suppressed to an indiscernible level in each of the regions. In addition, dummy patterns are formed on a different layer from the layer where the outgoing lines 108 are formed (specifically, on the same layer as gate lines 112 when the outgoing lines 108 are formed on the drain lines 116, or on the same layer as the drain lines 116 when the outgoing lines 108 are formed on the gate lines 112) under a condition not affecting the curing of the sealing member. Moreover, dummy patterns are formed similarly on an edge opposed to the line-extracting portion 508 when appropriate.

Figure 5B:
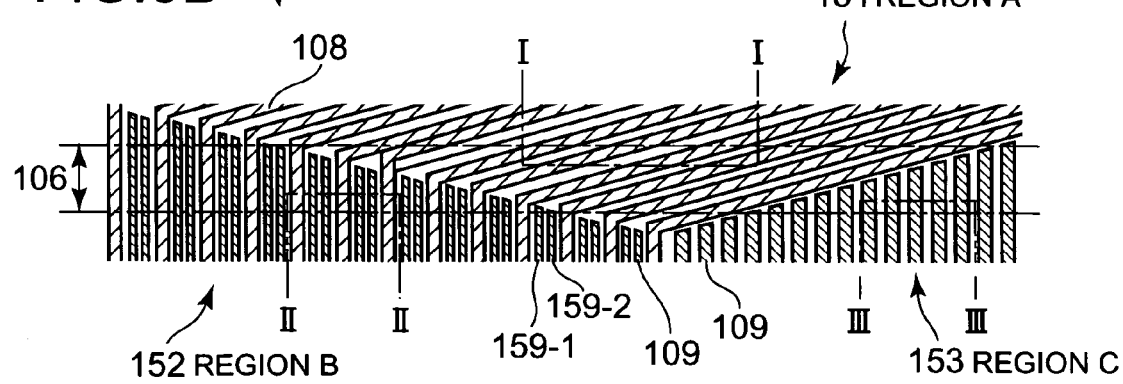
FIG. 5B is an enlarged plan view of a line-extracting portion 508 according to the first embodiment of the present invention shown in FIG. 5A.

To be more precise, as shown in FIG. 5A and FIG. 5B, in a LCD of this embodiment, a sealing member provided region 106 of the line-extracting portion is divided into the region A 151 where the outgoing lines 108 are arranged obliquely relative to an edge of the TFT substrate 102, the region B 152 where the outgoing lines 108 are arranged orthogonally to the edge of the TFT substrate 102, and the region C 153 between the adjacent flexible substrate 107 where the outgoing lines 108 are not formed. Then, in the LCD of this embodiment, dummy patterns 109 are arranged in the region C 153 at a predetermined pitch. Simultaneously, the dummy patterns 109 are also arranged between the outgoing lines 108 in the region B 152. In addition, the dummy patterns 109 in predetermined patterns are also formed in common junctions 518 located on edges (on an upper side and a right side in the drawing) opposed to the line-extracting portions when appropriate.

In this way, it is possible to adjust the density of the lines in the respective regions by forming the dummy patterns 109 at least in two regions out of the three regions of the line-extracting portion and in the common junction 518 when appropriate, and thereby to suppress the unevenness of the average level differences among the respective regions within a predetermined range.

Although the dummy pattern having two lines (159-1 and 159-2) are provided between the outgoing lines 108 in the region B 152 as shown in FIG. 5B, this is intended for preventing a short circuit between the outgoing lines 108 even when any of the outgoing lines 108 is short-circuited with the adjacent dummy pattern (159-1 or 159-2).

When it is possible to ensure sufficient intervals among the outgoing lines 108 and the dummy patterns 109, it is possible to form the dummy pattern 109 having a single line between each interval as shown in FIG. 6. Meanwhile, the dummy patterns are formed only in the region B and the region C of the line-extracting portion in FIG. 5A and FIG. 6. However, when there are large intervals between the outgoing lines 108 in the region A 171, it is also possible to form the dummy patterns 109 in the region A as shown in FIG. 7. Moreover, although the dummy patterns 109 are formed in a certain direction and at a constant pitch in FIG. 5A to FIG. 7, the dummy patterns 109 only need to be formed to achieve the average level differences within predetermined ranges in the respective regions. For example, as shown in FIG. 8, the dummy pattern 109 in a certain region (which is a region C 183 in the drawing) may be formed into a dot pattern 189 and the like. Alternatively, it is possible to form the dummy pattern 109 in a region B 182 into the dot pattern 189 and the like in order to suppress short-circuits among the outgoing lines 108 therein.

Meanwhile, when no lines are formed on the edge opposed to the line-extracting portion, the average level difference in that edge becomes lower than that on the edge where the line-extracting portion is provided. Moreover, when common lines are formed on the same layer as the gate lines 112 and the common lines are connected in the periphery of the TFT substrate 102, the average level difference of that edge becomes higher than the average level difference of the edge where the line-extracting portion is provided. In these cases, the gap varies in the entire LCD.

In these cases, it is also possible to balance the average level differences among the respective regions by providing a dedicated dummy pattern 109 or a dummy pattern 109 which also functions as the common lines, so that the average level differences fall in the predetermined range. When using the common lines also as the dummy pattern 109, it is necessary to connect the common lines on respective rows in the periphery of the TFT substrate 102. Accordingly, it is possible to form the dummy pattern 109 into a lattice as shown in FIG, 9, to form the dummy pattern 109 into a ladder shape as shown in FIG. 10, or to form the dummy pattern 109 by use of a group of lines arranged parallel to the edge, for example.

It is to be noted that the configurations shown in FIG. 5A to FIG. 11 are merely examples. It is only necessary that the dummy patterns 109 be formed in the respective regions A to C of the line-extracting portion and in the common junction opposed to the line-extracting portion so as to set the average level differences within the predetermined range.

Next, a method of manufacturing the TFT substrate 102 having the above-described dummy patterns 109 by use of the 4-mask process based on FIG. 16A will be described below.

Firstly, A1 is deposited in a thickness of about 200 nm on a transparent insulative substrate 110 such as a glass substrate, and Mo is deposited thereon in a thickness of about 70 nm by use of a sputtering method. Thereafter, a first resist pattern is formed by use of a known lithographic technique. Then, wet etching is performed by use of an etchant such as a mixture of phosphoric acid, nitric acid, and acetic acid while using the first resist pattern as a mask.

Then, the gate line 112 (a scan line) and a gate electrodes 112*a* are formed in a display area. Simultaneously, the dummy pattern 109 as shown in FIG. 5A to FIG. 8 is formed on one of the line-extracting portions (which is a lower end in FIG. 5A) outside the display area. Meanwhile, the outgoing line 108 to be connected to the gate line 112 is formed on the other line-extracting portion (which is a left end in FIG. 5A) Moreover, the dummy patterns 109, which also function as the common lines as shown in FIG. 9 to FIG. 11, are formed on the edges opposed to the line-extracting portions (which are upper and right ends in FIG. 5A).

Next, the gate insulating film 113 made of a silicon nitride film is deposited in a thickness of about 300 nm by use of a plasma CVD method or the like. In addition, an a-Si layer 114*a* and an n+a-Si layer 114*b* constituting a semiconductor layer of a TFT 110 are sequentially deposited thereon in thicknesses of about 200 nm and 30 nm, respectively. Subsequently Cr is deposited thereon in a thickness of about 300 nm by use of the sputtering method. Then, a second resist pattern, which has a thinner channel portion than other portions, is formed thereon by use of either a photomask (a reticle) provided with a light-shielding portion having a width equal to or below a resolution limit in the channel portion, or a photomask provided with a translucent region in the channel portion.

Next, wet etching is performed by use of an etchant such as cerium ammonium nitrate while using the second resist pattern as a mask. Then, the drain line 116 (a signal line), a drain electrode 116*a*, and a source electrode 117 are formed.

Subsequently, the a-Si layer 114*a* and the n+a-Si layer 114*b* are patterned and formed into the semiconductor layer 115 by use of a dry etching method. In this process, lamination of the semiconductor layer 115 on a lower layer and the drain line 116 on an upper layer is formed in the display area. Meanwhile, the outgoing line 108 as shown in FIG. 5A is formed on one of the line-extracting portions (which is the lower end in FIG. 5A) outside the display area, and the dummy pattern 109 similar to FIG. 5A to FIG. 8 is formed on the other line-extracting portion (which is the left end in FIG. 5A).

Next, the second resist pattern is etched by use of a dry etching method such as oxygen plasma ashing until the thin resist on the channel portion is completely removed. Thereafter, Cr in the channel portion is subjected to etching, and then the a-Si layer 114*a* and the n+a-Si layer 114*b* are partially removed by use of the dry etching method so as to expose the channel 10 region.

Next, the passivation film 118 made of a silicon nitride film is deposited in a thickness of about 150 nm by use of a plasma CVD method or the like. Thereafter, the passivation film 118 in a contact portion 120 is removed and a pixel electrode 119 made of a transparent electrode such as ITO is formed in a thickness of about 40 nm by use of the sputtering method. In this way, the pixel electrode 119 connected to the source electrode 117 at the contact portion 120 is formed accordingly. Thereafter, an alignment film is coated thereon and is subjected to an alignment treatment in a predetermined direction. In this way, the TFT substrate 102 is finished.

The regions A to C of the line-extracting portion of the TFT substrate 102 formed in the above-described process have cross-sectional structures as shown in FIG. 12A to FIG. 12C. Specifically, the wide outgoing lines 108 including the semiconductor layer 115 and the drain lines 116 are formed in the region A where the outgoing lines 108 are arranged obliquely. Here, as described previously, the thickness of the gate insulating film 113 is equal to 300 nm, the thickness of the semiconductor layer 115 is equal to 230 nm, the thickness of the drain line 116 is 300 nm, and the thickness of the passivation film 118 is equal to 150 nm. Since the width of each of the outgoing lines 108 in the I-I direction is equal to 83 μm and the pitch is set to 110 μm, the value (the average level difference) calculated by dividing the cross-sectional area of the constituents (the gate insulating film 113, the semiconductor layer 115, the drain line 116, and the passivation film 118) in a unit portion (such as one pitch) by the width of one pitch is equal to 0.40 μm.

Meanwhile, the dummy pattern 109 is further formed in the same layer as the gate line 112 in the region B where the outgoing lines 108 are formed orthogonally to the edge. Here, the thickness of the dummy pattern 109, i.e. the thickness of the gate line 112 is equal to 270 nm, the width of each of the outgoing lines 108 is equal to 25 μm, the pitch thereof is equal to 65 μm, and a line and a space of the dummy pattern 109 is equal to 8 μm. Accordingly, the average level difference is similarly calculated as 0.27 μm.

Meanwhile, only the dummy pattern 109 is formed on the same layer as the gate line 112 in the region C where the outgoing lines 108 are not formed. Here, the thickness of the dummy pattern 109 is equal to 270 nm, the width of the dummy pattern 109 is equal to 10 μm, and a space of the dummy pattern 109 is equal to 5 μm. Accordingly, the average level difference is similarly calculated as 0.20 μm.

Therefore, a variation in the average level difference (a value obtained by subtracting the minimum value from the maximum value) in the regions A, B, and C is calculated as 0.40−0.20=0.20 μm. Meanwhile, in the line-extracting portion on the left side in FIG. 5A, the outgoing lines 108 are formed on the same layer as the gate line 112 in the region A, the dummy pattern 109 is further formed on the same layer as the drain line 116 in the region B, and only the dummy pattern 109 is formed on the same layer as the drain line 116 in the region C. Accordingly, the average level differences in these regions have the same values as those described above.

Meanwhile, as a result of similar calculations on the conventional structure shown in FIG. 2A to FIG. 2C without formation of the dummy patterns 109, the average level difference in the region A of the conventional structure is equal to 0.40 μm as the same as the structure of this embodiment. The average level difference in the region B is equal to 0.13 μm, which is smaller than the structure of this embodiment because the dummy patterns 109 are not provided. The average level difference in the region C is equal to 0 μm, which represents the insulating film (the gate insulating film 113 and the passivation film 118) having the uniform thickness. Therefore, the variation in the average level difference is equal to 0.40 μm.

Here, the average level difference calculated by dividing the cross-sectional area of the constituents by the width is used for evaluation of the unevenness in each of the regions instead of a local level difference. This is because the region having high density of the outgoing lines 108 and the region having low density of the outgoing lines cannot be discriminated if the local level difference is applied. By using the average level difference, it is possible to evaluate the variation in the gap properly. Moreover, an effective difference in the height among the regions becomes more moderate as the variation in the average level becomes smaller. Accordingly, it is possible to suppress the variation in the gap between the substrate, i.e. deterioration of display quality.

Therefore, to evaluate appropriateness of using the average level difference, the gaps generated in the periphery of the LCD having the structure of this embodiment and in the periphery of the LCD having the conventional structure were actually measured. Results are shown in FIG. 13. Observing FIG. 13, it is apparent that the variation in the gap is more favorably suppressed in the structure of this embodiment (indicated by a thick line) as compared to the conventional structure (indicated by a thin line). In this way, it is obvious that the gap between the substrates can be evaluated by use of the average level difference.

Moreover, to clarify a correlation between the average level difference and the display quality, the display quality was evaluated by measuring the number of interference fringes appearing on display surfaces of LCDs in three types of the structure according to this embodiment having the average level difference of 0.20 μm (700 samples or above), the conventional structure having the average level difference of 0.40 μm (100000 samples or above), and a structure having the average level difference of 0.25 μm (500 samples or above). Results are shown in FIG. 17 and FIG. 14.

Observing FIG. 17, the number of interference fringes is equal to or below one line in all 700 samples in the structure of this embodiment shown in FIG. 5A and FIG. 5B, and the display quality is favorable. In terms of the structure having the average level difference of 0.25 μm, the number of interference fringes is in a range of 1 to 2 lines. This structure has poorer display quality than the structure of this embodiment, but remains in an allowable range as a product. On the contrary, in the conventional structure, the number of interference fringes is in a range of 2 to 4 lines, and many samples of this structure exceeded the allowable range. Moreover, observing the FIG. 14, it is apparent that average values of the number of interference fringes of the respective structures are substantially located on a straight line, which means that the interference fringes are increased in proportion to the increase in the average level difference. As a result, it is appropriate to set the allowable number of interference fringes equal to or below 2 lines as a product. To reduce the number of the interference fringed to 2 lines or below, it is apparent that the average level difference should be set to about 0.3 μm or below. Therefore, it is possible to obtain a LCD having favorable display quality by setting the width and the number of lines of the dummy pattern such that the average level difference, which is obtained by dividing the cross-sectional area of the respective constituents by the width, falls within the variation equal to or below 0.3 μm in terms of the respective regions of the sealing member provided region of the line-extracting portion.

Figure 4A:
FIG. 4A to FIG. 4C are process cross-sectional views showing an adhesion method for the LCD.
Figure 4B:
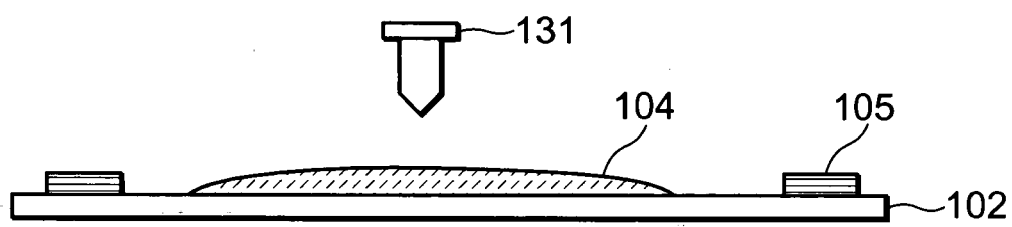
Figure 4C:
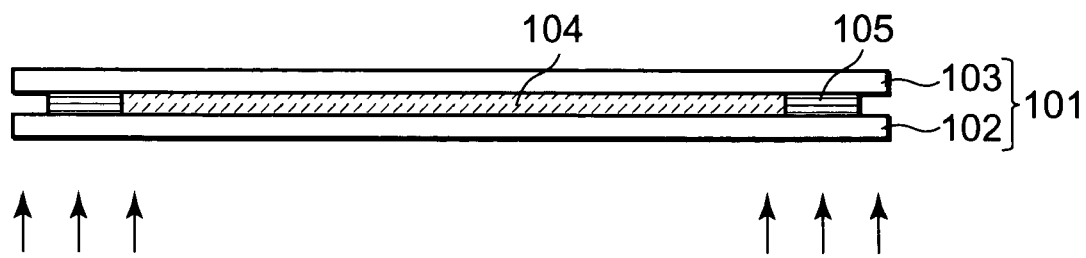

Meanwhile, when using photocuring resin such as ultraviolet curing resin as the sealing member 105, light such as ultraviolet rays is irradiated on a backside of the TFT substrate 102 after adhering the substrates to each other as shown in FIG. 4C. Accordingly, an increase in the density of the dummy pattern 109 complicates transmission of the light as a consequence, and therefore complicates curing of the sealing member 105. Accordingly, when setting the width and the number of the dummy pattern 109, it is preferable to provide sufficient aperture by reducing the width of the dummy pattern 109 while maintaining the range where the variation in the average level difference is equal to or below 0.3 μm. To be more precise, it is confirmed that the sealing member 105 can be surely cured by setting the numerical aperture (a ratio of an area of a portion where the outgoing lines 108 and the dummy patterns 109 are not formed relative to an area of the regions) equal to or above 25% and setting the widths of the outgoing lines 108 and the dummy patterns 109 equal to or below 80 μm.

As described above, the sealing member provided region of the line-extracting portion is divided into three or more regions depending on the density of the outgoing lines 108. Moreover, the dummy patterns 109 are formed in at least two regions so as to achieve the variation in the average level difference calculated by dividing the cross-sectional area of the constituents in each of the regions by the width equal to 0.3 μm or below, to achieve the numerical aperture equal to or above 25%, and to achieve the widths of the outgoing lines 108 and the dummy patterns 109 equal to or below 80 μm. In addition, it is possible to reduce the variation in the gap in the periphery of the LCD to an indiscernible level by forming the dedicated dummy pattern 109 or the dummy pattern 109, which also functions as the common lines, in the common junction on the edge opposed to the line-extracting portion so as to satisfy the similar conditions. In this way, it is possible to manufacture the LCD having excellent display quality.

Second Embodiment

Next, a LCD and a manufacturing method thereof according to a second embodiment of the present invention will be described with reference to FIG. 5A to FIG. 16C.

The first embodiment adopts the configuration in which the dummy patterns 109 are provided on the both edges (the lower end and the left end in FIG. 5A) where the outgoing lines 108 are formed. On the contrary, in the second embodiment of the present invention, the dummy patterns 109 are provided on any one of the edges (on a longer edge which is apt to cause the variation in the gap, for example).

The rest of the configuration of the second embodiment of the present invention is identical to the configuration of the first embodiment. Accordingly, the same reference numerals are designated. Therefore, the detailed description of the second embodiment of the present invention will be omitted.

Third Embodiment

Next, a LCD and a manufacturing method thereof according to a third embodiment of the present invention will be described with reference to FIG. 5A to FIG. 16C.

The first embodiment adopts the configuration in which the dummy patterns 109 on the same layer as the gate lines 112 are also used as the common lines on the edges opposed to the line-extracting portions. On the contrary, in the third embodiment of the present invention, the dummy patterns 109 are provided on the same layer as the drain lines 116 separately from the common lines.

The rest of the configuration of the third embodiment of the present invention is identical to the configuration of the first embodiment. Accordingly, the same reference numerals are designated. Therefore, the detailed description of the third embodiment of the present invention will be omitted.

Fourth Embodiment

Next, a LCD and a manufacturing method thereof according to a fourth embodiment of the present invention will be described with reference to FIG. 5A to FIG. 16C.

The first embodiment has been described by use of the 4-mask process as the example. On the contrary, the LCD and the manufacturing method thereof according to the fourth embodiment of the present invention uses the 5-mask process. The present invention is also applicable to the case of using the 5-mask process. Therefore, the detailed description of the fourth embodiment of the present invention will be omitted.

In addition, the LCD and the manufacturing method thereof according to the first embodiment of the present invention adopts an inversely staggered structure in which the gate electrode 112a is formed below the semiconductor layer 115. However, the present invention is not limited to this structure, and the present invention is also applicable to a stagger structure in which the gate electrode 112a is formed on the semiconductor layer 115.

Accordingly, it is apparent that these embodiments can be applied to any LCD panel including a twisted nematic liquid crystal display (a TN LCD) panel, in which transparent electrodes are provided on the respective substrates, and the liquid crystal is driven by electrical field in a longitudinal direction between the substrates, an in-plane switching mode liquid crystal display (an IPS LCD) panel, in which comb-shaped electrodes are provided on one of the substrates, and the liquid crystal is driven by electric field between the comb-shaped electrodes, and the like.

As described above, according to the LCD of the present invention, the sealing member provided region of the line-extracting portion is divided into three or more regions depending on the density of the outgoing lines, and the dummy patterns are formed in at least two regions in consideration of the effective height from the surface of the substrate calculated by dividing the cross-sectional area of the constituents by the width and of the condition for curing the sealing member. Accordingly, it is possible to reliably suppress the variation in the gap between the substrates attributable to the level differences between the respective regions. Moreover, by forming the dummy pattern similarly on the edge where the outgoing lines are not formed or by using the common lines as the dummy pattern, it is possible to suppress the variation in the gap on the entire LCD and thereby to improve the display quality. Furthermore, it is possible to surely prevent short circuits among the adjacent lines by forming the dummy patterns on a different layer from the layer where the outgoing lines are formed or by forming the dummy pattern between the outgoing lines in the form of a pattern having a plurality of parallel lines or in the form of a dot pattern, for example.

The present invention provides the following advantageous effects.

A first effect of the present invention is a capability of improving the display quality by suppressing the variation in the gap between the substrates in the periphery of the LCD.

This is attributable to the fact that the level differences among the respective regions can be effectively suppressed by dividing the sealing member provided region of the line-extracting portion in the periphery of the TFT substrate into three or more regions depending on the density of the outgoing lines and by forming the dummy patterns in at least two regions on one edge. It is also attributable to the fact that the variation in the gap between the substrates can be set within the allowable range by setting the shape and other factors of the dummy patterns so as to set a difference between the average level difference in the region having the highest density of the outgoing lines and the region having the lowest density of the outgoing lines to be equal to or below a standard value (0.3 μm) obtained based on the experiment, in consideration of the effective height (the average level difference) from the surface of the substrate calculated by dividing the cross-sectional area of the constituents by the width in each of the regions upon formation of the dummy patterns. Moreover, it is also attributable to the fact that the variation in the gap on the entire LCD can be suppressed by forming the dummy pattern similarly or using the common lines as the dummy pattern in terms of the edge where the outgoing lines are not formed.

A second effect of the present invention is a capability of preventing short circuits among the outgoing lines.

This is attributable to the fact that the dummy patterns are formed on a different layer from the layer where the outgoing lines are formed (specifically, on the same layer as gate lines when the outgoing lines are formed on the drain lines, or on the same layer as the drain lines when the outgoing lines are formed on the gate lines), and the adjacent outgoing lines are hardly short-circuited through the dummy patterns. Moreover, it is also attributable to the fact that short circuits among the outgoing lines can be prevented even if the outgoing lines are partially short-circuited with the dummy patterns by forming the dummy pattern into a pattern having a plurality of parallel lines or into a dot pattern.

A third effect of the present invention is a capability of preventing insufficient curing of the sealing member.

This is attributable to the fact that the conditions for forming the dummy patterns are set up in consideration of the condition for curing the sealing member when using the photocuring resin as the sealing member, and it is therefore possible to irradiate sufficient light onto the sealing member from the backside of the TFT substrate.

The above-described effects are achieved in any type of LCDs. However, the effects are more conspicuous in a LCD of a narrow framework type in which the outgoing lines are formed in the sealing member provided region in high density or in a LCD formed by the 4-mask process which is associated with thicker outgoing lines.

It is apparent that the present invention is not limited to the above embodiments, but may be modified and changed without departing from the scope and spirit of the invention.

What is claimed is:

1. A liquid crystal display device, comprising:
a thin film transistor substrate including first lines on a lower layer and second lines on an upper layer, the first lines and the second lines provided on a transparent insulative substrate approximately perpendicularly to each other, and thin film transistors provided in respective regions surrounded by the first lines and the second lines; and
a counter substrate facing the thin film transistor substrate,
wherein the thin film transistor substrate and the counter substrate are adhered to each other by use of a sealing member provided in the periphery of at least one of the substrates, and liquid crystal is interposed between the thin film transistor substrate and the counter substrate,
wherein outgoing lines for connecting any of the first lines and the second lines to an external circuit are formed in the periphery of two edges of the thin film transistor substrate,
a region where the sealing member is provided within a region where the outgoing lines are formed is divided into three or more regions depending on the density of the outgoing lines, and
in at least two regions out of the three or more regions, dummy patterns formed by any of the first lines and the second lines are provided on a different layer from a layer where the outgoing lines are formed on so as not to overlap the outgoing lines.

2. The liquid crystal display device according to claim 1, wherein the three or more regions comprises:
a first region where the outgoing lines are formed obliquely relative to an edge of the thin film transistor substrate;
a second region where the outgoing lines are formed in an orthogonal direction to the edge; and
a third region without formation of the outgoing lines.

3. The liquid crystal display device according to claim 2, wherein any of the dummy pattern including a plurality of approximately parallel lines and the dummy pattern including dots is provided between the adjacent outgoing lines in the second region.

4. The liquid crystal display device according to claim 1, wherein the dummy pattern is provided to satisfy that a difference between a maximum value and a minimum value of average level differences calculated by dividing a cross-sectional area of the respective constituents by a width of each of the three or more regions is equal to or below 0.3 μm.

5. The liquid crystal display device according to claim 1, wherein the dummy pattern formed of any of the first lines and the second lines is provided in a region where the sealing member is provided on an edge opposed to the edge where the outgoing lines are provided.

6. The liquid crystal display device according to claim 5, wherein the dummy patterns which also function as common lines are provided in a region where the sealing member is provided on the opposed edge when the common lines are formed on the same layer as a layer where the first lines are formed.

7. The liquid crystal display device according to claim 1, wherein a proportion of an area of a region without provision of the outgoing lines and the dummy pattern within the region where the sealing member is provided is set equal to or above 25% from a viewpoint along a normal line of the substrate when the sealing member is made of a material to be cured by light irradiated onto a backside of the thin film transistor substrate.

8. The liquid crystal display device according to claim 1, wherein a width of the dummy pattern is set equal to or below 80 μm when the sealing member is made of a material to be cured by light irradiated onto a backside of the thin film transistor substrate.

9. The liquid crystal display device according to claim 1, wherein the second lines adopts a laminated structure formed by laminating a semiconductor layer constituting the thin film transistors and a metallic layer constituting the drain lines.

* * * * *